US010642412B2

(12) United States Patent
Yang et al.

(10) Patent No.: US 10,642,412 B2
(45) Date of Patent: May 5, 2020

(54) CAPACITIVE DETECTION CIRCUIT AND ELECTRONIC DEVICE

(71) Applicant: SHENZHEN GOODIX TECHNOLOGY CO., LTD., Guangdong (CN)

(72) Inventors: Fu-Chiang Yang, Taipei (TW); Yingsi Liang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 120 days.

(21) Appl. No.: 16/122,145

(22) Filed: Sep. 5, 2018

(65) Prior Publication Data

US 2019/0018536 A1 Jan. 17, 2019

Related U.S. Application Data (63) Continuation of application No. PCT/CN2017/076667, filed on Mar. 14, 2017.

(51) Int. Cl.
*G06F 3/041* (2006.01)
*G06F 3/0354* (2013.01)
*G06F 3/044* (2006.01)

(52) U.S. Cl.
CPC ........ *G06F 3/0416* (2013.01); *G06F 3/03545* (2013.01); *G06F 3/044* (2013.01)

(58) Field of Classification Search
CPC ............................................. G06F 3/041–048
See application file for complete search history.

(56) References Cited

U.S. PATENT DOCUMENTS

2011/0061948 A1* 3/2011 Krah ..................... G06F 3/0418
178/18.01
2012/0327000 A1 12/2012 Oh
(Continued)

FOREIGN PATENT DOCUMENTS

CN 103207711 A 7/2013
CN 103323675 A 9/2013
(Continued)

OTHER PUBLICATIONS

Search Report dated Mar. 7, 2019 by the European Patent Office for counterpart application 17898354.0.
(Continued)

*Primary Examiner* — Roy P Rabindranath
(74) *Attorney, Agent, or Firm* — WPAT, P.C., Intellectual Property Attorneys; Anthony King (57) ABSTRACT

A capacitive detection circuit is provided according to the disclosure. The capacitive detection circuit is applied to an electronic device. The electronic device includes a touch screen, and the touch screen comprises a plurality of receiving electrodes. The capacitive detection circuit includes: a phase detection circuit for detecting a phase of a reception signal and generating a time signal, wherein the receiving electrode receives a transmission signal and generates the reception signal; a mixing module for performing a mixing operation on the reception signal according to the time signal so as to generate an output signal; and a back-end processing module for determining a capacitance corresponding to the receiving electrode according to the output signal. The time signal instructs the mixing module to perform the mixing operation on the reception signal after a first time point.

20 Claims, 8 Drawing Sheets

(56) References Cited

U.S. PATENT DOCUMENTS

2013/0088444 A1    4/2013  Kim et al.
2015/0123940 A1    5/2015  Park et al.
2017/0322245 A1*  11/2017  Wen .................. G01R 27/2605

FOREIGN PATENT DOCUMENTS

CN          104615315 A    5/2015
CN          106095206 A   11/2016
CN          106462309 A    2/2017

OTHER PUBLICATIONS

English abstract translation of CN103207711A.
English abstract translation of CN106462309A.
English abstract translation of CN106095206A.
English abstract translation of CN104615315A.
English abstract translation of CN103323675A.
International Search Report for PCT/CN2017/076667.
Written Opinion of the International Searching Authority for PCT/CN2017/076667.

* cited by examiner

CAPACITIVE DETECTION CIRCUIT AND ELECTRONIC DEVICE

CROSS REFERENCE TO RELATED APPLICATIONS

The present application is a continuation of international application PCT/CN2017/076667, filed on Mar. 14, 2017, which is hereby incorporated by reference in its entirety.

FIELD

The present disclosure relates to a capacitive detection circuit and an electronic device, and in particular, to a capacitive detection circuit and an electronic device that are capable of detecting a phase of a signal.

BACKGROUND

With the development of science and technology, the operation interfaces of various electronic products have gradually become humanized in recent years. For example, through a touch panel, the user can directly operate on the screen with a finger or a stylus to input information/words/patterns, thus eliminating the trouble of using an input device such as a keyboard or a key. In fact, the touch screen is usually composed of a sensing panel and a display disposed behind the sensing panel. An electronic device judges the intention of the user's touch on the sensing panel according to the position of the touch on the sensing panel and the screen presented by the display at that time, and executes a corresponding operation result.

In the related art, a technical solution in which an active stylus is used to perform touch operation has been developed. An active stylus can generate a transmission signal to a touch screen, and an electronic device having a touch screen performs signal processing (such as a mixing operation) on the transmission signal after the transmission signal is received so as to determine the position where the touch occurs. In the related art, since the electronic device and the active stylus are independent devices respectively, the capacitive sensing circuit in the touch screen doesn't have the information about the phase of the transmission signal, causing the mixing module in the capacitive sensing circuit to start the mixing operation blindly at an inappropriate time and causing the output signal of the mixing module to exceed a dynamic range of its internal output circuit, thereby resulting in distortion of the output signal.

Therefore, there is a need for improvement in the related art.

SUMMARY

Therefore, a main object of some embodiments of the present disclosure is to provide a capacitive detection circuit and an electronic device that are capable of detecting a phase of a signal, so as to overcome the drawbacks of the related art.

In order to solve the above issues, the present disclosure provides a capacitive detection circuit which can be applied to a first electronic device. The first electronic device includes a touch screen, and the touch screen includes a plurality of receiving electrodes. The capacitive detection circuit includes: a phase detection circuit, coupled to one of the plurality of receiving electrodes, and configured for detecting a phase of a reception signal received from the receiving electrode, and generating a time signal, where the receiving electrode receives a transmission signal and generates the reception signal, the transmission signal being generated by a second electronic device; a mixing module, coupled to the receiving electrode and the phase detection circuit, and configured for performing a mixing operation on the reception signal according to the time signal so as to generate an output signal; and a back-end processing module, coupled to the mixing module, and configured for determining a capacitance corresponding to the receiving electrode according to the output signal. The time signal instructs the mixing module to perform the mixing operation on the reception signal after a first time point.

For instance, the mixing module does not perform the mixing operation on the reception signal before the first time point.

For instance, the first time point is a time point at which the reception signal exceed a central voltage of the reception signal, and the central voltage is an average value of a maximum voltage and a minimum voltage of the reception signal.

For instance, when the phase detection circuit detects that the reception signal is greater than a first voltage, the phase detection circuit generates the time signal so as to instruct the mixing operation on the reception signal after the first time point.

For instance, when the phase detection circuit detects that the reception signal is less than a second voltage, the phase detection circuit generates the time signal so as to instruct the mixing operation on the reception signal after the first time point.

For instance, the phase detection circuit includes a comparator, which is configured for determining whether the reception signal is greater than a first voltage, or determining whether the reception signal is less than a second voltage.

For instance, the phase detection circuit further includes a logic circuit, which is coupled to the comparator, and configured for generating the time signal when the reception signal is greater than the first voltage or the reception signal is less than the second voltage.

For instance, the mixing module includes: a local oscillator, coupled to the phase detection circuit for receiving the time signal, and configured for generating an oscillation signal after the first time point; a mixer, coupled to the receiving electrode and the local oscillator, and configured for performing a wave mixing operation on the reception signal according to the oscillating signal so as to generate a wave mixing result; and an integrating circuit, coupled to the mixer, and configured for performing an integrating operation on the wave mixing result so as to generate the output signal.

For instance, the local oscillator does not generate the oscillation signal before the first time point.

For instance, the mixer includes: a positive buffer including a positive input terminal, configured for receiving the reception signal, and a positive output terminal; a negative buffer including a negative input terminal, configured for receiving the reception signal, and a negative output terminal; and a switch unit, coupled to the positive output terminal and the negative output terminal, and controlled by the oscillation signal. The switch unit outputs the wave mixing result.

For instance, the integrating circuit includes: an amplifier, coupled to the mixer, and configured for receiving the wave mixing result and outputting the output signal; and an integrating capacitor, coupled between an input terminal and an output terminal of the amplifier.

For instance, the integrating circuit further includes a reset switch, coupled between the input terminal and the output terminal of the amplifier. The reset switch is turned on at the first time point, and the reset switch is turned off after the first time point.

For instance, the mixer has a first mixer input terminal, a second mixer input terminal, a first mixer output terminal, and a second mixer output terminal. The integrating circuit has a first integrating input terminal, a second integrating input terminal, a first integrating output terminal and a second integrating output terminal.

For instance, the mixer includes: a first mixer switch, coupled between the first mixer input terminal and the first mixer output terminal; a second mixer switch, coupled between the second mixer input terminal and the second mixer output terminal; a third mixer switch, coupled between the first mixer input terminal and the second mixer output terminal; and a fourth mixer switch, coupled between the second mixer input terminal and the first mixer output terminal.

For instance, the integrating circuit includes: a fully differential amplifier, coupled to the first integrating input terminal, the second integrating input terminal, the first integrating output terminal and the second integrating output terminal; a first integrating capacitor, coupled to the first integrating input terminal and the first integrating output terminal; and a second integrating capacitor, coupled to the second integrating input terminal and the second integrating output terminal.

For instance, the second electronic device is a stylus.

For instance, the phase detection circuit includes a diode and a capacitor. One end of the capacitor is coupled to the diode, and the other end of the capacitor is coupled to a ground terminal.

The present disclosure further provides an electronic device including a touch screen and a capacitive detection circuit. The touch screen includes a plurality of receiving electrodes. The capacitive detection circuit includes: a phase detection circuit, coupled to one of the plurality of receiving electrodes, and configured for detecting a phase of a reception signal and generating a time signal, where the receiving electrode receives a transmission signal and generates the reception signal, the transmission signal being generated by a second electronic device; a mixing module, coupled to the receiving electrode and the phase detection circuit, and configured for performing a mixing operation on the reception signal according to the time signal so as to generate an output signal; and a back-end processing module, coupled to the mixing module, and configured for determining a capacitance corresponding to the receiving electrode according to the output signal. The time signal instructs the mixing module to perform the mixing operation on the reception signal after a first time point.

BRIEF DESCRIPTION OF THE DRAWINGS

One or more embodiments are exemplarily illustrated in combination with the respective figures in the accompanying drawings, and the exemplary illustration should not be construed as limiting the embodiments. Elements having the same reference numerals in the drawings are similar elements, unless specifically stated otherwise, and the figures in the accompanying drawings are not drawn to scale.

DETAILED DESCRIPTION

In order to make the objects, technical solutions, and advantages of the present disclosure clearer, the present disclosure will be described below in further detail with reference to the accompanying drawings and embodiments. It should be understood that the specific embodiments described herein are only used to explain the present disclosure and are not intended to limit the present disclosure.

Figure 1:
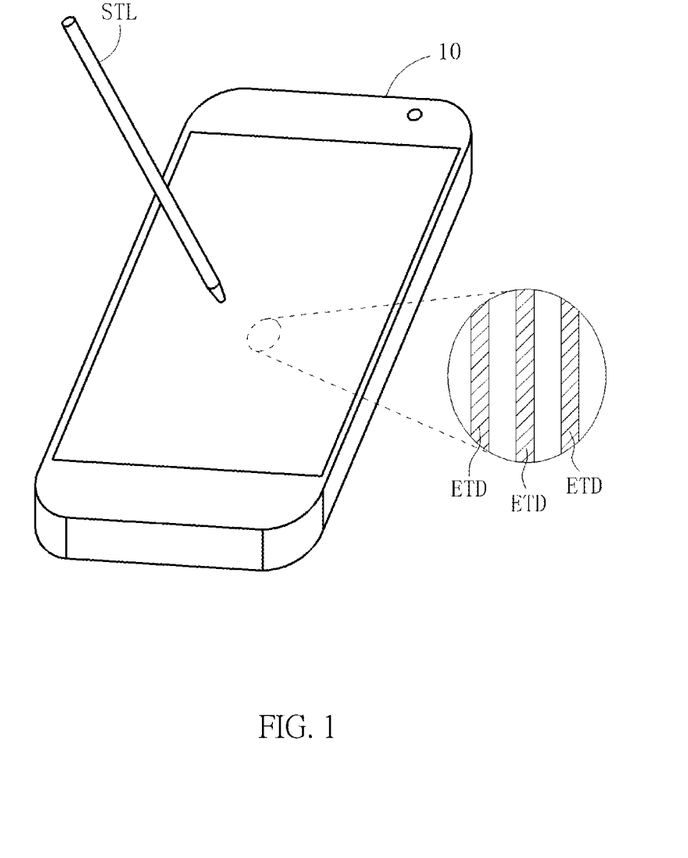
FIG. 1 is a schematic diagram of an electronic device according to an embodiment of the present disclosure.
Figure 2:
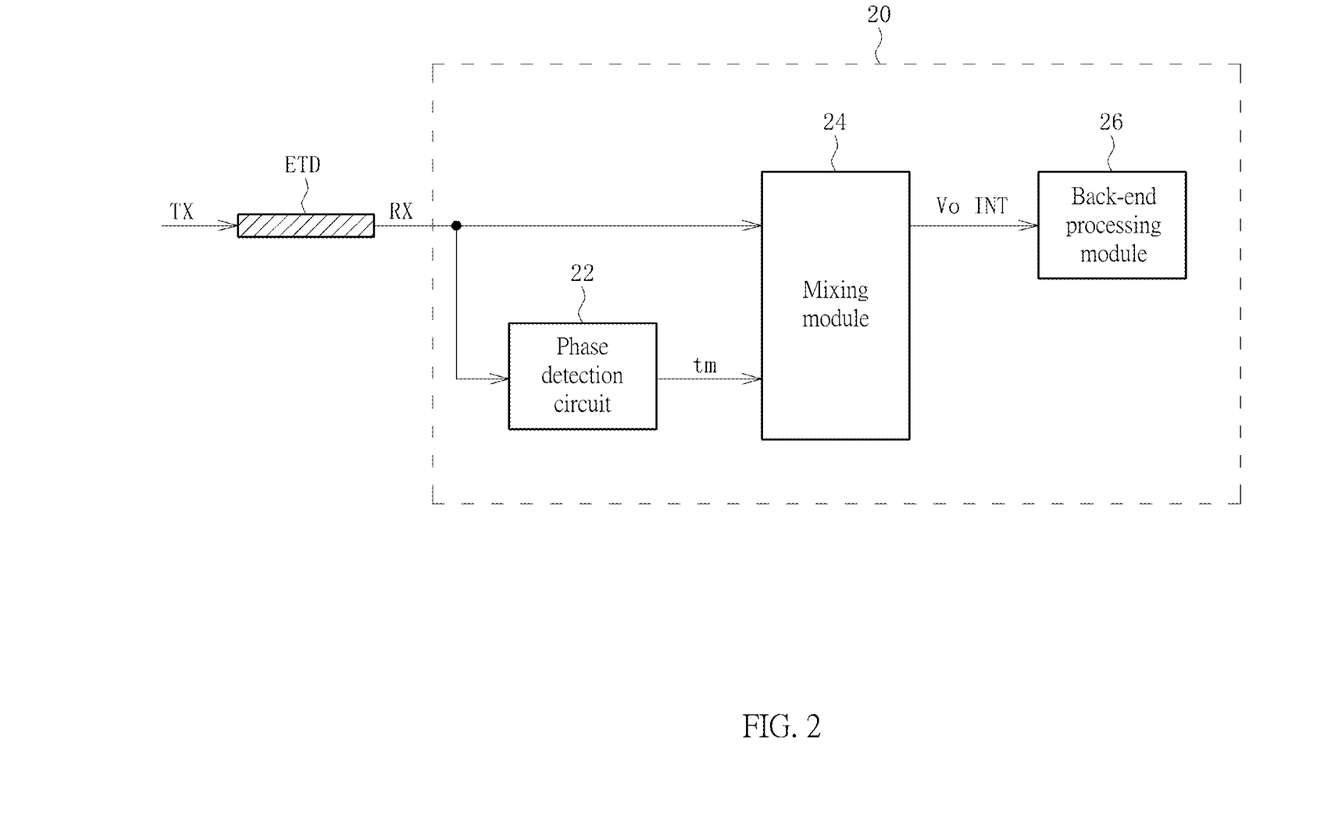
FIG. 2 is a schematic diagram of a capacitive detection circuit according to an embodiment of the present disclosure.

Reference is made to FIG. 1 and FIG. 2, in which FIG. 1 is a schematic diagram of an electronic device 10 according to an embodiment of the present disclosure, and FIG. 2 is a schematic diagram of a capacitive detection circuit 20 according to an embodiment of the present disclosure. The electronic device 10 may be a smart phone, a tablet computer, or an interactive display device. The electronic device 10 includes a touch screen and a capacitive detection circuit 20. The touch screen includes a plurality of receiving electrodes ETD. The user can use an active stylus STL to operate on the touch screen, and the active stylus STL includes an active assembly to generate a transmission signal TX to the receiving electrode ETD. The receiving electrode ETD receives the transmission signal TX generated by the active stylus STL and generates a reception signal RX to the capacitive detection circuit 20. The capacitive detection circuit 20 can detect a capacitance corresponding to the receiving electrode ETD to determine the coordinate position where the touch occurs. Both the transmission signal TX and the reception signal RX are periodic signals, and the periods thereof are known to the capacitive detection circuit 20. For brevity, FIG. 2 shows only one of the plurality of receiving electrodes ETD. As shown in FIG. 2, the capacitive detection circuit 20 is coupled to the receiving electrode ETD. The capacitive detection circuit 20 includes a phase detection circuit 22, a mixing module 24 and a back-end processing module 26. The phase detection circuit 22 is coupled to the receiving electrode ETD for detecting a phase of the reception signal RX, and generates a time signal tm to the mixing module 24. The time signal tm is used to instruct the mixing module 24 to start a mixing operation on the reception signal RX at a start time $t_f$, and before the start time $t_f$, the mixing module 24 does not perform a frequency mixing operation on the reception signal RX. For example, the mixing module 24 may be enabled only after the start time $t_f$. Before the start time $t_f$, the mixing module 24 is disabled. That is, the mixing module 24 coupled to the reception signal RX and the phase detection circuit 22 may perform a mixing operation on the reception signal RX according to the time signal tm to generate an output signal Vo_INT. The back-end processing module 26 is coupled to the mixing module 24 for determining the capacitance corresponding to the receiving electrode ETD according to the output signal Vo_INT.

It should be noted that, before the start time $t_I$, the mixing module 24 may not perform the mixing operation on the reception signal RX. In addition, the start time $t_I$ may correspond to a fixed phase of the reception signal RX. Preferably, the start time $t_I$ may correspond to a time point at which the reception signal RX exceed a central voltage $V_{CM}$ of the reception signal RX, wherein a central voltage $V_{CM}$ may be a common-mode voltage of the reception signal RX, which may be an average value of a maximum voltage $V_{max}$ and a minimum voltage $V_{min}$ of the reception signal RX. For example, the central voltage $V_{CM}$ may be expressed as $V_{CM}=(V_{max}+V_{min})/2$.

Figure 3:
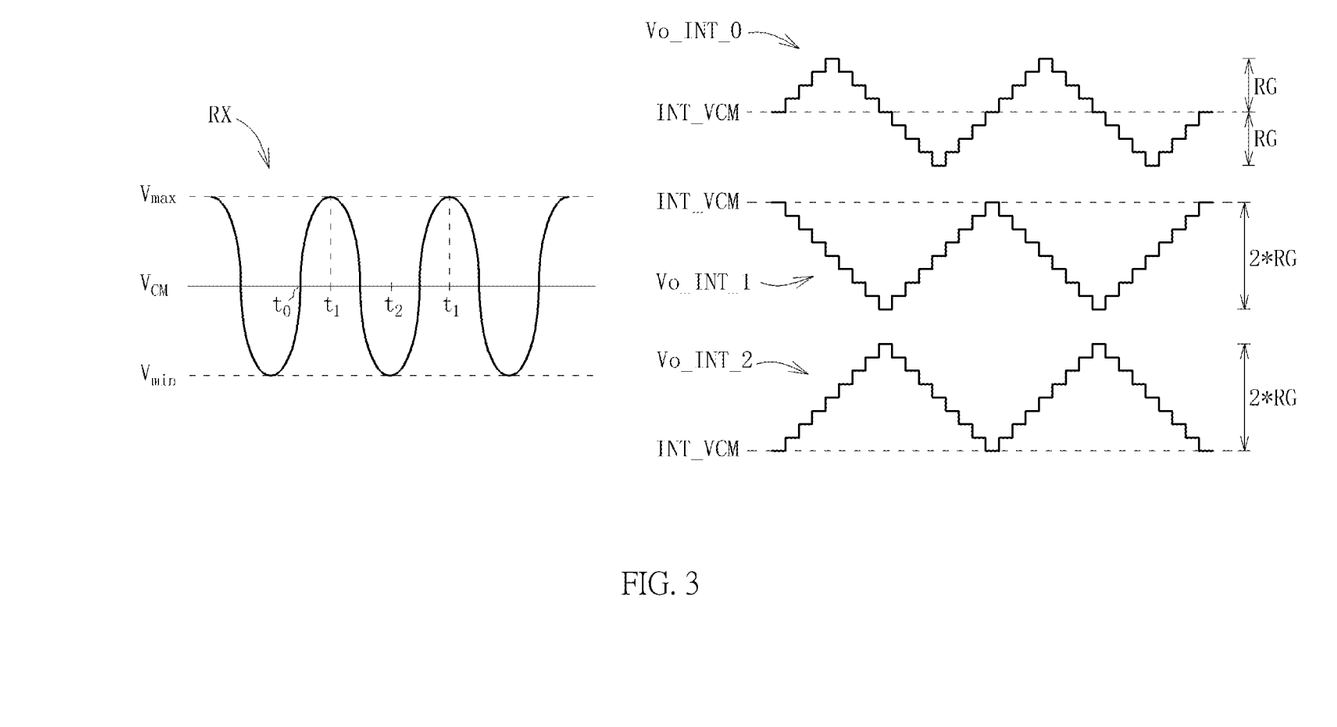
FIG. 3 is a waveform diagram of a plurality of signals.

Reference is made to FIG. 3, which is a signal waveform diagram of the reception signal RX and the output signals Vo_INT_0, Vo_INT_1 and Vo_INT_2, wherein the output signals Vo_INT_0, Vo_INT_1 and Vo_INT_2 correspond to the results of mixing (i.e., the output signals) of the mixing operation on the reception signal RX by the mixing module 24 after the start times $t_0$, $t_1$ and $t_2$, respectively. The time $t_0$ corresponds to the time when the value of the reception signal RX is the central voltage $V_{CM}$, and the time $t_1$ corresponds to the time when the value of the reception signal RX is the maximum voltage $V_{max}$, and the time $t_2$ corresponds to the time when the value of the reception signal RX is the minimum voltage $V_{min}$. In addition, INT_VCM represents an output common-mode voltage of the mixing module 24, and RG represents a variation range of the output signal.

As can be seen from FIG. 3, the output signals Vo_INT_0, Vo_INT_1 and Vo_INT_2 all exhibit periodic fluctuations with the reception signal RX. It should be noted that the signal value of the output signal Vo_INT_0 is centered on the output common-mode voltage INT_VCM. The range of upward and downward fluctuations is between INT_VCM+RG and INT_VCM−RG; the output common-mode voltage INT_VCM is the upper boundary of the signal value of the output signal Vo_INT_1, and the range of upward and downward fluctuations thereof is between INT_VCM and INT_VCM−2*RG; the output common-mode voltage INT_VCM is the lower boundary of the signal value of the output signal Vo_INT_2, and the range of upward and downward fluctuations thereof is between INT_VCM+2*RG and INT_VCM.

In other words, when the mixing module 24 starts to perform a mixing operation on the reception signal RX after time $t_0$ (i.e., the start time $t_I$ is time $t_0$, namely, $t_I=t_0$), an internal output circuit having a smaller output dynamic range can be utilized to implement the mixing module 24. Specifically, in order to prevent the output signal from being distorted due to the dynamic range of the internal output circuit of the mixing module 24, if the phase of the reception signal RX is not detected through the phase detection circuit 22, the internal output circuit of the mixing module 24 reserves a large output dynamic range (at least between INT_VCM+2*RG and INT_VCM−2*RG, that is, if the phase of the reception signal RX is not detected through the phase detection circuit 22, the internal output circuit of the mixing module 24 has to reserve an output dynamic range of 4*RG so that it be sufficient to ensure that the output signal is not saturated. That is, the mixing module 24 needs to implement the internal output circuit of the mixing module 24 by using higher-order/high-cost circuit. In contrast, if the phase of the reception signal RX is detected through the phase detection circuit 22, the mixing module 24 can use an internal output circuit having a smaller output dynamic range. Preferably, if the start time $t_I$ is the time $t_0$ (i.e., the mixing operation on the reception signal RX starts at the time $t_0$), the output dynamic range of the internal output circuit of the mixing module 24 may be smaller (it only need to be between INT_VCM+RG and INT_VCM−RG) without causing distortion of the output signal of the mixing module 24. That is, the mixing module 24 can use a lower-order/low-cost circuit to implement the internal output circuit of the mixing module 24.

On the other hand, for the mixing module 24 implemented with an internal output circuit having a specific dynamic range DR (the dynamic range DR is roughly between INT_VCM+RG and INT_VCM−RG), if the phase of the reception signal RX is not detected through the phase detection circuit 22, the output signal of the mixing module 24 may be distorted due to insufficient dynamic range DR. In contrast, when the mixing module 24 starts the mixing operation on the reception signal RX at the time $t_0$, the output signal Vo_INT of the mixing module 24 will not be distorted since there is a sufficient dynamic range DR.

It should be noted that the transmission signal TX is not generated by the electronic device 10. The capacitive detection circuit 20 receives the reception signal RX corresponding to the transmission signal TX only when the user operates on the touch screen with the active stylus STL. In the related art, the capacitive detection circuit used to determine the touch position in the electronic device knows nothing about the phase of the transmission signal TX, and the mixing modules in the existing capacitive detection circuits cannot properly select/control the start of mixing operation, thus resulting in distortion of the output signal. To avoid distortion of the output signal, an internal output circuit having a large dynamic range is required to implement the mixing module, which increases the cost of production. In contrast, the present disclosure utilizes the phase detection circuit 22 to detect the phase of the reception signal RX, and accordingly generates a time signal tm to indicate the time when the mixing module 24 starts the mixing operation on the reception signal RX (which can be the time $t_0$, wherein the time $t_0$ corresponds to a time point at which the reception signal RX exceed a central voltage $V_{CM}$ of the reception signal RX) so as to ensure that the output signal Vo_INT of the mixing module 24 is in the dynamic range DR of the mixing module 24 without causing distortion of signal. In other words, the mixing module 24 can be implemented with an internal output circuit having a lower dynamic range, thereby reducing the cost of production.

It should be noted that there is no limitation on the manner in which the phase detection circuit 22 detects the phase of the reception signal RX. In an embodiment, the phase detection circuit 22 can detect whether the reception signal RX is greater than a voltage V1. When the phase detection circuit 22 detects that the reception signal RX is greater than the voltage V1, the phase detection circuit 22 can generate the time signal tm so that the mixing module 24 can start the mixing operation on the reception signal RX at the start time $t_0$. In another embodiment, the phase detection circuit 22 can detect whether the reception signal RX is less than a voltage V2. When the phase detection circuit 22 detects that the reception signal RX is less than the voltage V2, the phase detection circuit 22 can generate the time signal tm so that the mixing module 24 can start the mixing operation on the reception signal RX at the start time t0.

Figure 4:
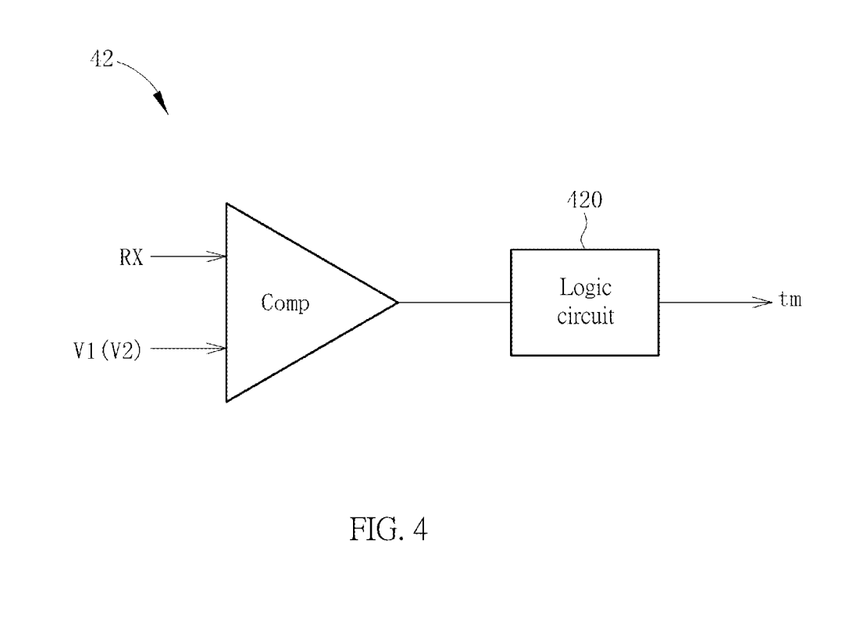
FIG. 4 is a schematic diagram of a phase detection circuit according to an embodiment of the present disclosure.

To elaborate, reference is made to FIG. 4, which is a schematic diagram of a phase detection circuit 42 according to an embodiment of the present disclosure. The phase detection circuit 42 may be used to implement the phase detection circuit 22. As shown in FIG. 4, the phase detection circuit 42 includes a comparator Comp and a logic circuit 420. The comparator Comp is used to determine whether the reception signal RX is greater than the voltage V1 (or to determine whether the reception signal RX is less than the voltage V2), and the logic circuit 420 is coupled to the comparator Comp. When the reception signal RX is greater than the voltage V1 (or the reception signal RX is less than the voltage V2), the output signal of the comparator Comp changes its state (i.e., an output high potential of the comparator Comp changes into an output low potential, or an output low potential changes into an output high potential). At this point, the logic circuit 420 may generate the time signal tm, so that the mixing module 24 may start the mixing operation on the reception signal RX at the start time $t_0$. Specifically, since the reception signal RX has a periodicity and its period is known to the phase detection circuits 22 and 42, when the phase detection circuit 42 detects that the reception signal RX is increasing progressively and greater than the voltage V1, the logic circuit 420 can infer the time $t_0$ at which the reception signal RX exceed a central voltage $V_{CM}$, and generate the time signal tm accordingly. In this way, the mixing module 24 can start the mixing operation on the reception signal RX at the start time $t_0$ according to the time signal tm.

Figure 5:
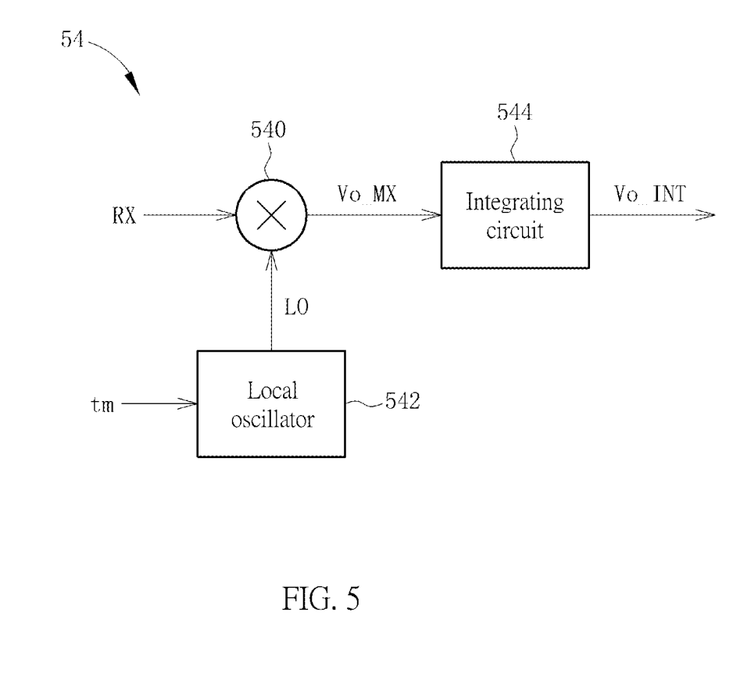
FIG. 5 is a schematic diagram of a mixing module according to an example of the present disclosure.

In addition, there is no limitation on the circuit structure of the mixing module 24. Reference is made to FIG. 5, which is a schematic diagram of a mixing module 54 according to an embodiment of the present disclosure. The mixing module 54 may be used to implement the mixing module 24. As shown in FIG. 5, the mixing module 54 includes a local oscillator 542, a mixer 540 and an integrating circuit 544. The local oscillator 542 is coupled to the phase detection circuit 22 (or the phase detection circuit 42) for receiving the time signal tm so as to generate an oscillation signal LO according to the time signal tm. In an embodiment, the local oscillator 542 can start generating the oscillation signal LO after the start time $t_0$ according to the time signal tm, that is, the local oscillator 542 does not generate the oscillation signal LO before the start time $t_0$. In addition, the mixer 540 is coupled to the receiving electrode ETD and the local oscillator 542 for performing a wave mixing operation on the reception signal RX according to the oscillating signal LO so as to generate a wave mixing result Vo_MX. The integrating circuit 544 is coupled to the mixer 540 for performing an integrating operation on the wave mixing result Vo_MX so as to generate the output signal Vo_INT.

Figure 6:
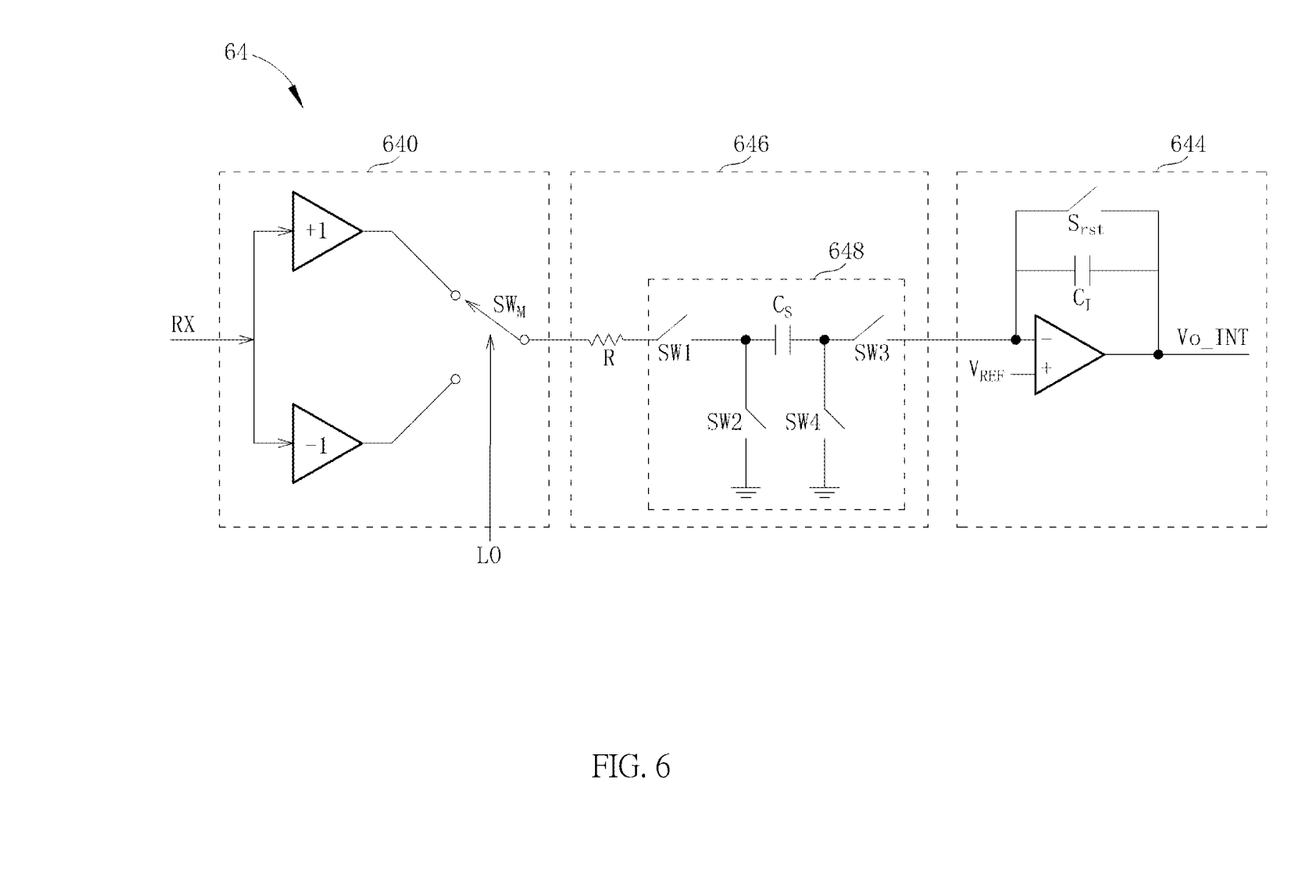
FIG. 6 is a schematic diagram of a mixing module according to an embodiment of the present disclosure.

There is no limitation on the circuit structures of the mixer 540 and the integrating circuit 544. For example, reference is made to FIG. 6, which is a schematic diagram of a mixing module 64 according to an embodiment of the present disclosure. The mixing module 64 includes a switching mixture 640 and an integrating circuit 644. The switching mixer 640 can be used to implement the mixer 540, and the integrating circuit 644 can be used to implement the integrating circuit 544. Specifically, the switching mixer 640 includes a positive buffer (marked with "+1"), a negative buffer (marked with "−1"), and a switch unit $SW_M$. A positive input terminal of the positive buffer and a negative input terminal of the negative buffer are used for receiving the reception signal RX. The switch unit $SW_M$ is coupled to a positive output terminal of the positive buffer and a negative output terminal of the negative buffer. The unit $SW_M$ is controlled by the oscillation signal LO so as to be switched between the positive output terminal and the negative output terminal. The switch unit $SW_M$ is used to switch the integration direction of the integrating circuit 242. The oscillation signal LO can have two different signal values, which can be a logic 1 or a logic 0, or a signal having a signal value of A or −A. The integrating circuit 644 includes an amplifier Amp, and an integrating capacitor $C_I$ which is coupled between a negative input terminal (marked with "−") and an output terminal of the amplifier Amp. A positive input terminal (marked with "+") of the amplifier Amp receives a reference voltage $V_{REF}$. The integrating circuit 644 may further include a reset switch $S_{rst}$. The reset switch $S_{rst}$ is also coupled between the negative input terminal and the output terminal of the amplifier Amp. The reset switch $S_{rst}$ may be controlled by a control signal ctrl, wherein the control signal ctrl is dependent on the time signal tm. The reset switch $S_{rst}$ may be turned on at the time $t_0$ to empty the charges in the integrating capacitor $C_I$. After time $t_0$, the reset switch $S_{rst}$ may be turned off. In addition, the mixing module 64 may further include an impedance unit 646. The impedance unit 646 is coupled between the switching mixer 640 and the integrating circuit 644. The impedance unit 646 may include a switching capacitor module 648 and a resistor R.

Figure 7:
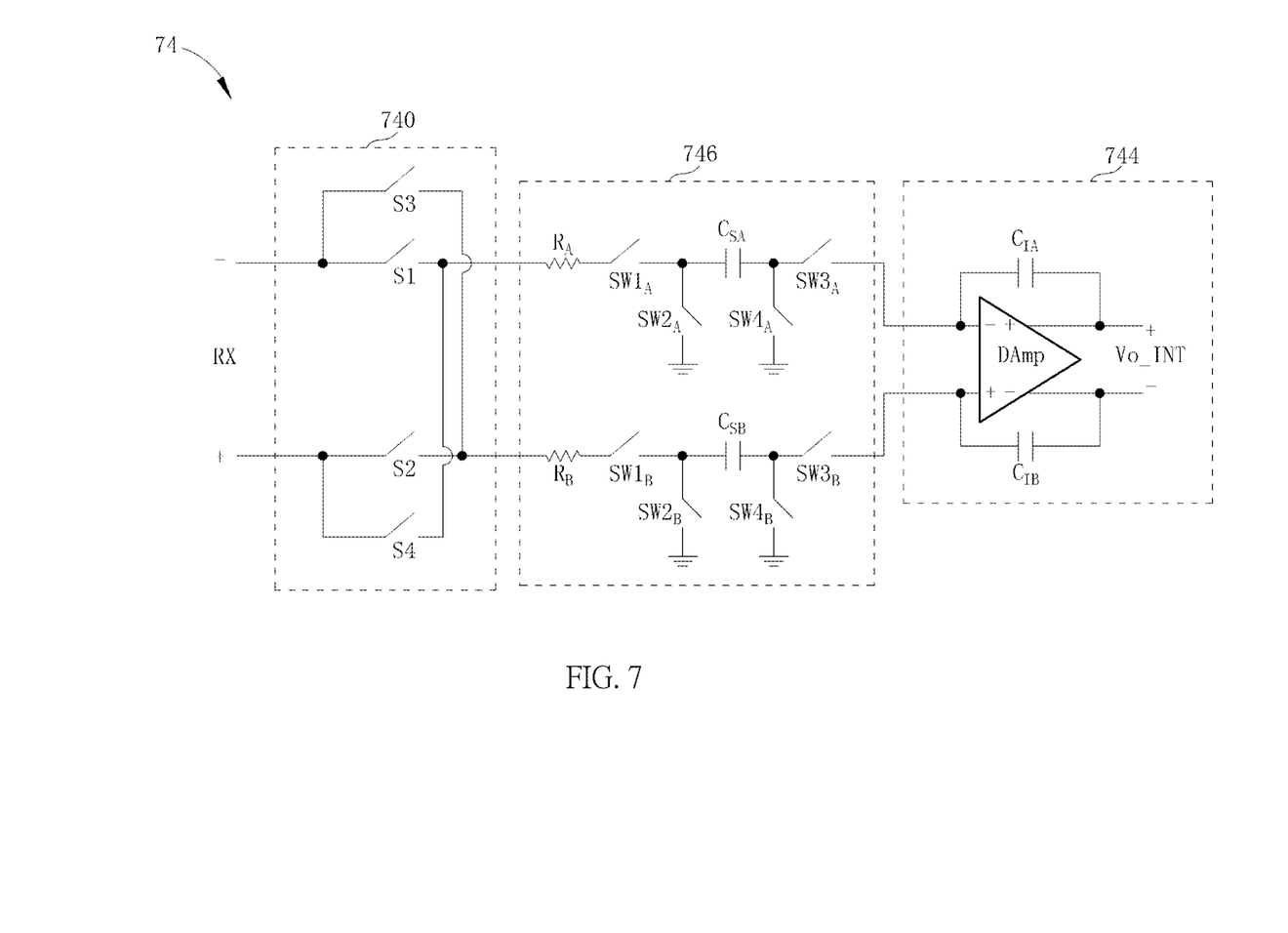
FIG. 7 is a schematic diagram of a mixing module according to an embodiment of the present disclosure.

In addition, reference is made to FIG. 7, which is a schematic diagram of a mixing module 74 according to an embodiment of the present disclosure. The mixing module 74 includes a switching mixer 740 and an integrating circuit 744. The switching mixer 740 can be used to implement the mixer 540, and the integrating circuit 744 can be used to implement the integrating circuit 544. The switching mixer 740 has a first mixer input terminal, a second mixer input terminal, a first mixer output terminal, and a second mixer output terminal. The integrating circuit 742 has a first integrating input terminal, a second integrating input terminal, a first integrating output terminal and a second integrating output terminal, wherein the first mixer input terminal and the second mixer input terminal are used to receive the reception signal RX, and the first integrating output terminal and the second integrating output terminal are used to output the output signal Vo_INT. The switching mixer 740 includes mixer switches S1~S4. The mixer switch S1 is coupled between the first mixer input terminal and the first mixer output terminal. The mixer switch S2 is coupled between the second mixer input terminal and the second mixer output terminal. The mixer switch S3 is coupled between the first mixer input terminal and the second mixer output terminal. The mixer switch S4 is coupled between the second mixer input terminal and the first mixer output terminal. The mixer switches S1 to S4 can be controlled by the oscillation signal LO and a complementary signal LO' corresponding to the oscillation signal LO. The oscillation signal LO and the complementary signal LO' are orthogonal to each other (i.e., the time point at which the oscillation signal LO is at a high potential and the time point at which the complementary signal LO' is at a high potential are not overlapped with each other). In addition, the integrating circuit 742 includes a fully differential amplifier DAmp and an integrating capacitor $C_{IA}$, $C_{IB}$. A negative input terminal (marked with "−") of the fully differential amplifier DAmp is coupled to the first integrating input terminal. A positive input terminal (marked with "+") of the fully differential amplifier DAmp is coupled to the second integrating input terminal. A positive output terminal (marked with "+") of the fully differential amplifier DAmp is coupled to the first integrating output terminal. A negative output terminal (marked with "−") of the fully differential amplifier DAmp is coupled to the second integrating output terminal. The integrating capacitor $C_{IA}$ is coupled between the negative input terminal and the positive output terminal of the fully differential amplifier DAmp (i.e., the integrating capacitor $C_{IA}$ is coupled between the first integrating input terminal and the first integrating output terminal); the integrating capacitor $C_{IB}$ is coupled between the positive input terminal and the negative output terminal of the fully differential amplifier DAmp (i.e., the integrating capacitor $C_{IA}$ is coupled between the second integrating input terminal and the second integrating output terminal). In addition, the mixing module 74 may further include an impedance unit 746. The circuit structure of the impedance unit 746 is similar to that of the impedance unit 646, so a description thereof will not be repeated herein.

In addition, the start time $t_I$ is not limited to the time $t_0$ corresponding to a time point at which the reception signal RX exceed a central voltage $V_{CM}$ of the reception signal RX. The start time $t_I$ may also be the time $t_1$ corresponding to the maximum voltage $V_{max}$ of the reception signal RX, or the time $t_2$ corresponding to the minimum voltage $V_{min}$ of the reception signal RX, or even a time corresponding to any value of the reception signal RX. As long as the start time $t_I$ corresponds to the fixed phase of the reception signal RX, the requirements of the present disclosure are satisfied without departing from the scope of the present disclosure.

Figure 8:
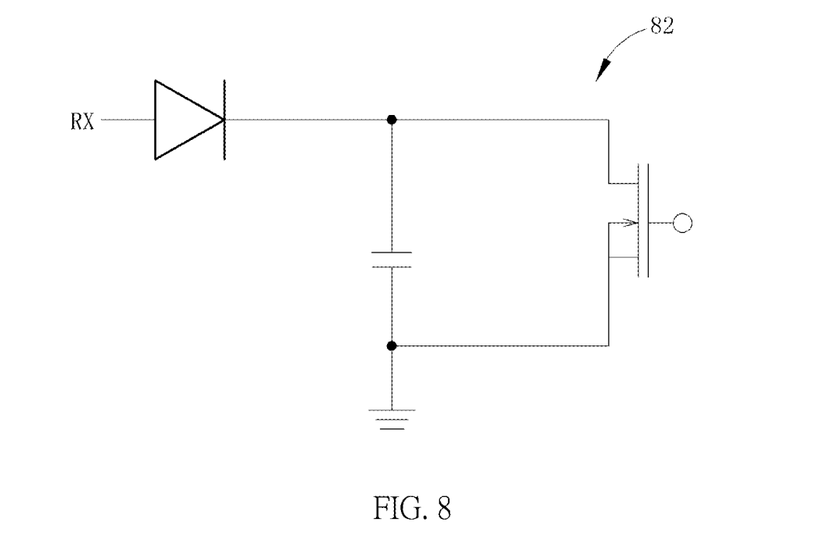
FIG. 8 is a schematic diagram of a phase detection circuit according to an embodiment of the present disclosure.
Figure 9:
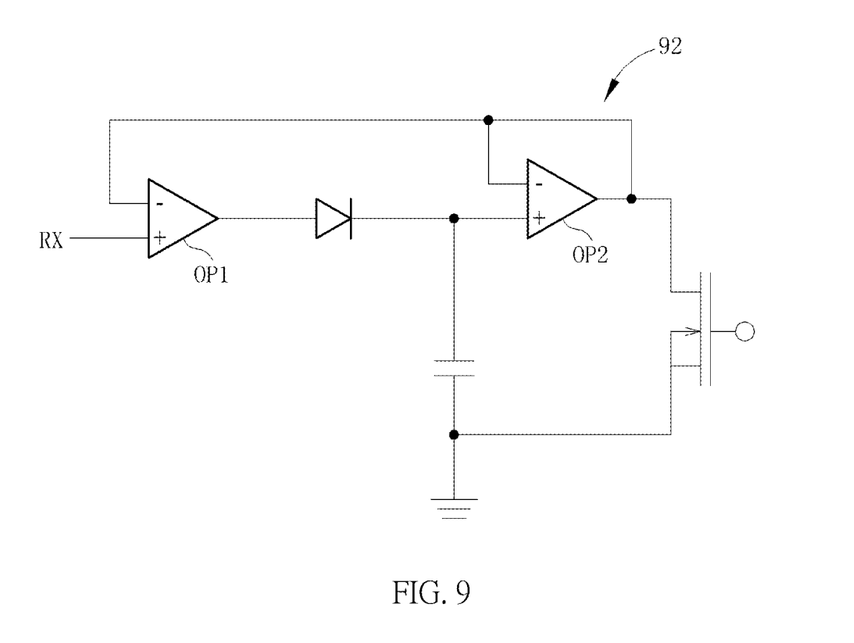
FIG. 9 is a schematic diagram of a phase detection circuit according to an embodiment of the present disclosure.

In addition, the phase detection circuit of the present disclosure is not limited to the inclusion of a comparator, and may also be implemented by other circuits. For example, reference is made to FIG. 8 and FIG. 9, which are schematic diagrams of a phase detection circuit 82 and a phase detection circuit 92 of an embodiment of the present disclosure, respectively. The phase detection circuit 82 includes a diode, a capacitor and a transistor. The diode receives the reception signal RX. A first terminal of the capacitor is coupled to the diode, and a second terminal of the capacitor is coupled to a ground terminal. The transistor is coupled to between the first terminal and second terminal of the capacitor. In addition, the phase detection circuit 92 is similar to the phase detection circuit 82, and is different from the phase detection circuit 82 in that the phase detection circuit 92 further includes operational amplifiers OP1 and OP2. The negative input terminals (marked with "−") of the operational amplifier OP1 and the operational amplifier OP2 are both coupled to an output terminal of the operational amplifier OP2, and a positive input terminal (marked with "+") of the operational amplifier OP2 is coupled between the diode and the capacitor. A positive input terminal (marked with "+") of the operational amplifier OP1 is used to receive the reception signal RX, and the transistor is coupled between the output terminal of the operational amplifier OP2 and the second terminal of the capacitor.

In addition, there is no limitation on the manner in which the mixing module is disabled before the start time $t_I$. In an embodiment, the capacitive detection circuit can disable the local oscillator 542, the mixer 540, or the integrating circuit 544 in the mixing module 54 shown in FIG. 5 before the start time $t_I$ according to the time signal tm. The effect of disabling the mixing module 54 is thus achieved. In an embodiment, the capacitive detection circuit may turn off the switches SW1, SW3 (or the switches $SW1_A$, $SW3_A$, $SW1_B$, $SW3_B$) shown in FIG. 6 (or FIG. 7) before the start time $t_I$ according to the time signal tm, and the effect of disabling the mixing module 64 (or the mixing module 74) can also be achieved. In addition, before the start time $t_I$, the capacitive detection circuit may control or turn off a front-end circuit of the mixing module, so that the reception signal RX cannot be transmitted to the mixing module. In this way, the effect of not performing the mixing operation on the reception signal RX before the start time $t_I$ can also be achieved.

In summary, the present disclosure uses a phase detection circuit to detect the phase of a reception signal and generates a time signal accordingly to instruct the mixing module to start a mixing operation on the reception signal at a specific start time, thus ensuring that the output signal of the mixing module is within the dynamic range of the mixing module without causing distortion of the signal. In other words, the present disclosure can utilize an internal output circuit having a low output dynamic range to implement a mixing module, thereby reducing the production cost of the capacitive detection circuit.

The above description merely relates to some embodiments of the present disclosure and is not intended to limit the present disclosure. Any change, equivalent substitution, improvements or the like made within the spirit and principles of the present disclosure should be considered as falling within the scope of protection of the present disclosure.

What is claimed is:

1. A capacitive detection circuit applied to a first electronic device, the first electronic device comprises a touch screen, the touch screen comprises a plurality of receiving electrodes, wherein the capacitive detection circuit comprises:
   a phase detection circuit, coupled to one of the plurality of receiving electrodes, the phase detection circuit is configured for detecting a phase of a reception signal received from the receiving electrode and generating a time signal according to the reception signal, wherein the receiving electrode receives a transmission signal and generates the reception signal, and the transmission signal is generated by a second electronic device;
   a mixing module, coupled to the receiving electrode and the phase detection circuit, the mixing module is configured for performing a mixing operation on the reception signal according to the time signal to generate an output signal; and
   a back-end processing module, coupled to the mixing module, the back-end processing module is configured for determining a capacitance corresponding to the receiving electrode according to the output signal;
   wherein the time signal instructs the mixing module to perform the mixing operation on the reception signal after a first time point.

2. The capacitive detection circuit of claim 1, wherein the mixing module does not perform the mixing operation on the reception signal before the first time point.

3. The capacitive detection circuit of claim 1, wherein the first time point is a time point at which the reception signal exceeds a central voltage of the reception signal, and the central voltage is an average value of a maximum voltage and a minimum voltage of the reception signal.

4. The capacitive detection circuit of claim 1, wherein when the phase detection circuit detects that the reception signal is greater than a first voltage, the phase detection circuit generates the time signal to instruct the mixing operation on the reception signal after the first time point.

5. The capacitive detection circuit of claim 1, wherein when the phase detection circuit detects that the reception signal is less than a second voltage, the phase detection circuit generates the time signal to instruct the mixing operation on the reception signal after the first time point.

6. The capacitive detection circuit of claim 1, wherein the phase detection circuit comprises:

a comparator, the comparator is configured for determining whether the reception signal is greater than a first voltage, or determining whether the reception signal is less than a second voltage.

7. The capacitive detection circuit of claim 6, wherein the phase detection circuit further comprises:
a logic circuit, coupled to the comparator, the logic circuit is configured for generating the time signal when the reception signal is greater than the first voltage or the reception signal is less than the second voltage.

8. The capacitive detection circuit of claim 1, wherein the mixing module comprises:
a local oscillator, coupled to the phase detection circuit for receiving the time signal, the local oscillator is configured for generating an oscillation signal after the first time point;
a mixer, coupled to the receiving electrode and the local oscillator, the mixer is configured for performing a wave mixing operation on the reception signal according to the oscillating signal to generate a wave mixing result; and
an integrating circuit, coupled to the mixer, the integrating circuit is configured for performing an integrating operation on the wave mixing result to generate the output signal.

9. The capacitive detection circuit of claim 8, wherein the local oscillator does not generate the oscillation signal before the first time point.

10. The capacitive detection circuit of claim 8, wherein the mixer comprises:
a positive buffer comprising:
a positive input terminal, is configured for receiving the reception signal; and
a positive output terminal;
a negative buffer comprising:
a negative input terminal, configured for receiving the reception signal; and
a negative output terminal; and
a switch unit, coupled to the positive output terminal and the negative output terminal, the switch unit is controlled by the oscillation signal and outputting the wave mixing result.

11. The capacitive detection circuit of claim 8, wherein the integrating circuit comprises:
an amplifier, coupled to the mixer, the amplifier is configured for receiving the wave mixing result and outputting the output signal; and
an integrating capacitor, coupled between an input terminal and an output terminal of the amplifier.

12. The capacitive detection circuit of claim 11, wherein the integrating circuit further comprises:
a reset switch, coupled between the input terminal and the output terminal of the amplifier;
wherein the reset switch is turned on at the first time point, and the reset switch is turned off after the first time point.

13. The capacitive detection circuit of claim 8, wherein the mixer has a first mixer input terminal, a second mixer input terminal, a first mixer output terminal, and a second mixer output terminal, and the integrating circuit has a first integrating input terminal, a second integrating input terminal, a first integrating output terminal and a second integrating output terminal.

14. The capacitive detection circuit of claim 13, wherein the mixer comprises:
a first mixer switch, coupled between the first mixer input terminal and the first mixer output terminal;
a second mixer switch, coupled between the second mixer input terminal and the second mixer output terminal;
a third mixer switch, coupled between the first mixer input terminal and the second mixer output terminal; and
a fourth mixer switch, coupled between the second mixer input terminal and the first mixer output terminal.

15. The capacitive detection circuit of claim 13, wherein the integrating circuit comprises:
a fully differential amplifier, coupled to the first integrating input terminal, the second integrating input terminal, the first integrating output terminal and the second integrating output terminal;
a first integrating capacitor, coupled to the first integrating input terminal and the first integrating output terminal; and
a second integrating capacitor, coupled to the second integrating input terminal and the second integrating output terminal.

16. The capacitive detection circuit of claim 1, wherein the phase detection circuit comprises:
a diode; and
a capacitor, one end of the capacitor is coupled to the diode, and the other end of the capacitor is coupled to a ground terminal.

17. The capacitive detection circuit of claim 1, wherein the second electronic device is a stylus.

18. An electronic device, comprising:
a touch screen, comprising a plurality of receiving electrodes; and
a capacitive detection circuit, wherein the capacitive detection circuit comprises:
a phase detection circuit, coupled to one of the plurality of receiving electrodes, the phase detection circuit is configured for detecting a phase of a reception signal received from the receiving electrode and generating a time signal according to the reception signal, wherein the receiving electrode receives a transmission signal and generates the reception signal, and the transmission signal is generated by a second electronic device;
a mixing module, coupled to the receiving electrode and the phase detection circuit, the mixing module is configured for performing a mixing operation on the reception signal according to the time signal to generate an output signal; and
a back-end processing module, coupled to the mixing module, the back-end processing module is configured for determining a capacitance corresponding to the receiving electrode according to the output signal;
wherein the time signal instructs the mixing module to perform the mixing operation on the reception signal after a first time point.

19. The electronic device according to claim 18, wherein the first time point is a time point at which the reception signal exceeds a central voltage of the reception signal, and the central voltage is an average value of a maximum voltage and a minimum voltage of the reception signal.

20. The electronic device according to claim 18, wherein the second electronic device is a stylus.

* * * * *